United States Patent [19]
Swanberg et al.

[11] Patent Number: 5,117,243
[45] Date of Patent: May 26, 1992

[54] SCANNER WITH ELECTRONIC NON-LINEARITY COMPENSATION AND METHOD OF PROCESSING IMAGE DATA

[75] Inventors: Melvin E. Swanberg, Claremont; Yee-Ming Chung, South Pasadena; Raymond Eskenazi, Los Angeles; Robert T. Cunningham, Canyon Country, all of Calif.

[73] Assignee: S&R Tech Development, Inc., Monrovia, Calif.

[21] Appl. No.: 506,683

[22] Filed: Apr. 6, 1990

[51] Int. Cl.⁵ .............................................. H04N 1/21
[52] U.S. Cl. ..................................... 346/108; 358/298
[58] Field of Search ............... 346/108, 107 R, 160, 346/76 L; 358/298, 296, 300, 302

[56] References Cited

U.S. PATENT DOCUMENTS

| | | |
|---|---|---|
| 3,867,571 | 2/1975 | Starkweather et al. |
| 3,995,110 | 11/1976 | Starkweather |
| 4,034,408 | 7/1977 | Starkweather |
| 4,040,096 | 8/1977 | Starkweather |
| 4,230,394 | 10/1980 | Brueggemann et al. |
| 4,247,160 | 1/1981 | Brueggemann |
| 4,257,053 | 3/1981 | Gilbreath ............................ 346/108 |
| 4,475,787 | 10/1984 | Starkweather |
| 4,512,625 | 4/1985 | Brueggemann |
| 4,595,947 | 6/1986 | Brueggemann |
| 4,624,528 | 11/1986 | Brueggemann |
| 4,662,709 | 5/1987 | Brueggemann |
| 4,682,842 | 7/1987 | Brueggemann |
| 4,805,974 | 2/1989 | Brueggemann et al. |

Primary Examiner—Mark Reinhart
Attorney, Agent, or Firm—Matthew F. Jodziewicz

[57] ABSTRACT

A scanner system includes a light source and scanning components for moving a spot of light across a surface along a scan line of predetermined length. An electronic control system is included for controlling the light beam in order to produce a plurality of pixels on the surface along the scan line. It is configured to control the position and exposure of each of the pixels in order to compensate for pixel position distortion and pixel exposure distortion caused by variations in spot velocity. Preferably, the control system produces a digital scan clock signal or other control signal that defines a pixel interval and an exposure interval for each of a plurality of desired pixel positions along the scan line according to stored pixel interval and exposure interval data.

17 Claims, 5 Drawing Sheets

SCANNER WITH ELECTRONIC NON-LINEARITY COMPENSATION AND METHOD OF PROCESSING IMAGE DATA

BACKGROUND OF THE INVENTION

1. Technical Field

This invention relates generally to input and output scanners, and more particularly to a scanner having a control system that compensates for scanner non-linearity electronically.

2. Background Information

A scanner includes some type of scanning means for directing a light beam to a spot on a surface to be scanned. It does so in such a way that the spot moves across the surface along a scan line in a precisely controlled manner. That enables various input and output functions such as reading a document or printing a page.

Scanner non-linearity refers to variations in spot velocity occurring as the spot moves along the scan line. It is typically caused in such systems as polygon or galvanometer laser scanner systems by system geometry or a velocity variation of the scanning means and it can affect scanner performance. A scanner having a multifaceted rotating polygon, for example, directs the light beam at a constant angular velocity. But the spot is farther from the polygon facets at the ends of the scan line than it is at the center and so spot velocity increases as the spot moves from the center toward the ends.

Some scanners compensate for the effects of such non-linearity electronically. They may include a control system with a variable frequency oscillator (VCO) that varies the rate at which the light beam is turned on and off during the course of scanning (i.e., the pixel data rate). Since the light beam turns on to begin writing a pixel, varying the rate at which it turns on and off serves to control pixel placement along the scan line. That is done according to variations in spot velocity in order to more evenly space the pixels and thereby at least partially compensate for what is sometimes referred to as pixel position distortion.

Although adequate for some applications, such compensation does not always satisfy more stringent requirements. That is because variations in spot velocity can also cause variations in pixel exposure. Sometimes referred to as pixel exposure distortion, it can result in objectionable variations in shade despite compensation for pixel position distortion. It is conceivable to vary the intensity of the light beam in proportion to spot velocity in order to offset that effect, but accurate intensity control may be difficult and expensive to achieve, particularly for direct control of a solid state or gas laser, for example, or for some type of light modulation. Thus, it is desirable to have some other way to reduce unwanted variations in shade of the type described.

SUMMARY OF THE INVENTION

This invention solves the problems outlined above by providing a scanner having a control system that includes means for electronically controlling both pixel position and pixel exposure. Preferably, the control system is configured to cause the light beam to produce each of the pixels at a respective one of a corresponding plurality of desired pixel positions along the scan line. For that purpose, the control system may turn the light beam on at just the right time to offset variations in spot velocity. Doing so causes the pixels to be more evenly spaced along the scan line. Preferably, the control system is also configured to result in a desired exposure of each pixel. For that purpose, the control system may be configured to activate the light beam for just the right total dwell time for each pixel position to offset variations in spot velocity. That results in a more even shade from pixel to pixel.

Thus, the scanner system of this invention includes a control system that compensates for pixel exposure distortion as well as pixel position distortion. It does so by turning the light beam on and off in a way that achieves a more consistent dwell time from pixel to pixel. It avoids varying light beam intensity. It provides significantly improved control of pixel position and exposure, and it can be configured to compensate for distortion inherent in data being written.

Generally, a scanner system constructed according to the invention includes a light source for producing a light beam. It also includes scanning components for directing the light beam to a spot on a surface to be scanned that is located at a predetermined location relative to the scanning means and for moving the spot across the surface along a scan line of predetermined length. Those components may be similar in many respects to corresponding components of existing scanners.

In addition, the scanner includes an electronic control system for controlling the light beam so that the light beam produces a plurality of pixels on the surface along the scan line. According to a major aspect of the invention the control means is configured to control the position and exposure of each of the pixels. Preferably, the control system is configured to produce a control signal both for activating the light beam at each of a plurality of pixel positions along the scan line and for activating the light beam for a desired dwell time for each of the pixel positions. Preferably, the control signal defines a pixel interval and an exposure interval for each pixel position, and it is configured to vary the pixel interval and the exposure interval according to spot velocity. For that purpose, the control system in one embodiment is configured to synchronize the control signal with spot position.

Preferably, the control signal is a digital signal. It is produced according to bit mapping techniques using stored pixel interval data and exposure interval data. The data may be updated from one scan line to another so that the pixel interval and exposure interval data varies from one scan line to another scan line.

DESCRIPTION OF THE PREFERRED EMBODIMENT

Figure 1:
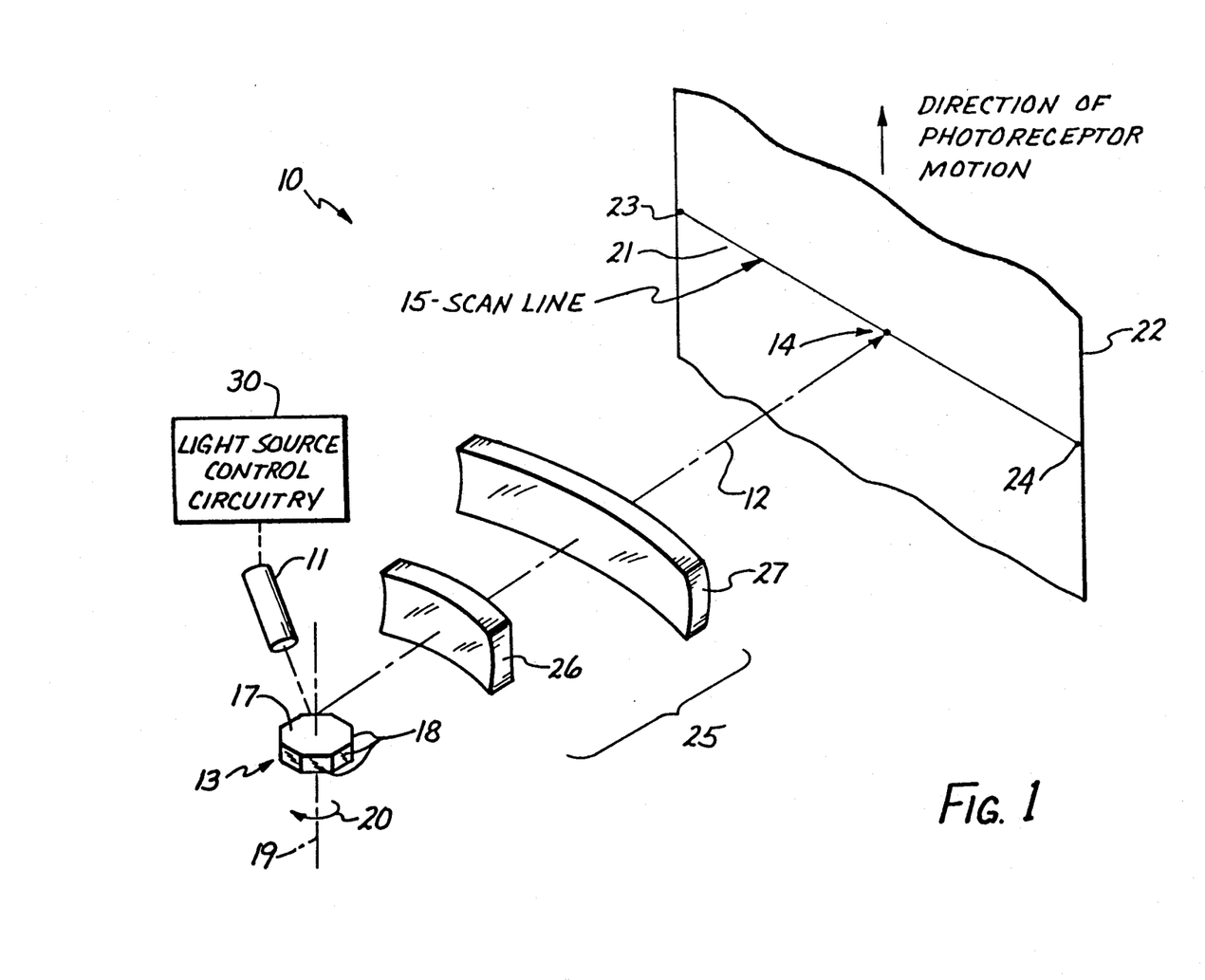
FIG. 1 of the drawings is a diagrammatic representation of a scanner constructed according to the invention.

FIG. 1 illustrates a scanner system 10 constructed according to the invention. Generally, the scanner system 10 includes a light source 11 for generating a light beam 12 and scanning means 13 for directing the light beam 12 to a spot 14 at a predetermined location relative to the scanning means 13. The scanning means 13 also serves to move the spot 14 along a scan line 15 of specified length at the predetermined location. For that purpose, the scanning means 13 in the illustrated scanner system 10 includes a rotatable element or polygon 17 with a plurality of light reflecting facets 18 (eight facets being illustrated) and other known mechanical components that are depicted in FIG. 1 by the polygon 17 rotating about a rotational axis 19 in the direction of an arrow 20.

As the polygon 17 rotates, the light beam 12 is directed by the facets 18 toward an image plane at a surface 21 to be scanned, such as the surface of a photoreceptor 22, scanning across the surface 21 in a known manner along the scan line 15 from a first end 23 of the scan line 15 past a center (the illustrated position of the spot 14) and on to a second end 24 of the scan line 15. Thus, the light beam 12 scans in a scan plane defined as a plane containing both the scan line 15 and a central light beam position that is the position occupied by the light beam 12 when it is directed toward the center of the scan line 15 (i.e., the position of the light beam 12 that is illustrated in FIG. 1).

Those components may be similar in many respects to corresponding components of existing scanner systems and the scanner system 10 may include a post-facet lens system 25 having first and second elements 26 and 27 that compensate for field curvature and wobble. Of course, the post-facet lens system 25 may be omitted without departing from the inventive concepts disclosed. In addition, the light source 11 may include a known type of infrared laser diode and known conditioning optics, for example. It forms a beam at the facets 18 that is collimated in the scan plane and focused in the cross-scan plane. That is done so that the beam has a proper diameter in the scan plane and a proper Numeric Aperture (NA) in the cross-scan plane. In the scan plane, the conditioning optic can be a single aspheric lens of short focal length, for example, or a laser diode collector which is similar to a microscope objective but designed for infrared light and for infinite conjugates. In the cross-scan plane (i.e., the plane containing both the central light beam position and a line perpendicular to the scan plane), the optic has the same diode collector, with the addition of a cylinder lens to focus the collimated beam at the facets 18.

Many of those things are well known in the art and reference is made to Brueggemann U.S. Pat. Nos. 4,512,625, 4,247,160, 4,230,394, 4,662,709, 4,805,974, 4,682,842, 4,624,528, and 4,595,947 for the various details of scanner system construction provided. For that purpose, reference is also made to Starkweather U.S. Pat. Nos. 4,475,787, 3,995,110, 3,867,571, 4,040,096, and 4,034,408. Of course, any of various light sources may be employed without departing from the inventive concepts disclosed, however.

A major way the scanner system 10 differs from existing designs is in having light source control circuitry 30 as subsequently described with reference to FIGS. 1-6. It serves as an electronic control system for controlling the light beam 12 in order to produce a plurality of pixels on the surface along the scan line 15. For that purpose, the circuitry 30 may be configured in some respects according to known techniques. But according to a major aspect, it is configured to control the position and exposure of each of the pixels. In other words, it includes circuitry such as that illustrated in block diagram form in FIG. 2.

The control system may, for example, be configured using known componentry and design techniques to produce a control signal for activating the light beam at each of a plurality of desired pixel positions along the scan line (e.g., the central portion of each pixel position being evenly spaced at 1/300 inch intervals for 300 dpi resolution). Preferably, the control system is configured so that the control signal defines a pixel interval for each pixel position and so that the pixel interval defined by the control signal varies according to spot velocity. For that purpose, the control system may synchronize the control signal with spot position by suitable known means, such as by responding to a start-of-scan (SOS) control signal or other synchronizing signal produced by known means, in order to vary the pixel interval according to spot velocity. The control system may include suitable known means for producing a synchronizing signal, such as described in U.S. Pat. No. 4,729,617. That patent illustrates a scanning clock generating device that includes a photosensor for producing an SOS synchronizing signal with a photosensor and it is incorporated by reference for all the various details provided.

In addition, the control system may be so configured that the control signal activates the light beam for a desired dwell time for each of a plurality of desired pixel positions along the scan line. For that purpose, the control signal may define an exposure interval for each pixel position, and the control system may be configured to vary the exposure interval defined by the control signal according to spot velocity. The synchronizing signal is used to synchronize the control signal with spot position in order to vary the exposure interval according to spot velocity also.

Broadly stated another way, the invention provides a means for compensating for both the dimensional or pixel position distortion and the exposure distortion of a nonlinear scanning system with significant accuracy and stability. That compensation is provided by controlling two temporal parameters of each and every pixel along the scan line 15. Those temporal parameters are the pixel interval and the exposure interval, and they translate into spatial parameters in accordance with the scanning spot velocity, the pixel interval translating into pixel spacing and the exposure interval translating into spot blur and exposure energy.

Each of those two parameters are independently controlled in increments or slices. Thus, the pixel increment and exposure increment can be expressed in digital form as a given number of slices. A crystal controlled oscillator, or other stable frequency source provides the basic timing for the slices, thereby providing a conversion factor from the digital to the temporal format.

A memory device is used to store the two parameters of each pixel, with the storage position in the memory corresponding to a given pixel in the scan line 15 such that the data for each pixel can be retrieved sequentially. That data is input to clock controller circuitry which generates the pixel clock waveform (i.e., the scan clock waveform) in accordance with the digital data. That makes it possible to locate each and every pixel within ±½ slice of the desired location along the scan line 15. The number of slices per pixel determines the basic accuracy of the system 10.

Figure 2:
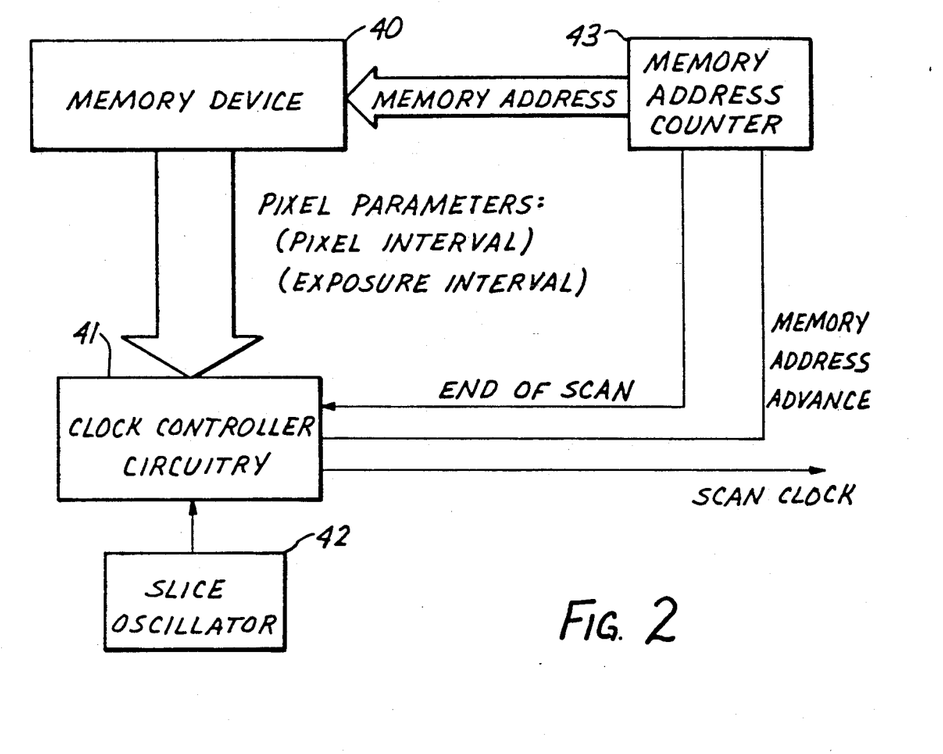
FIG. 2 is a diagrammatic representation in block diagram form of various aspects of the light source control circuitry.

FIG. 2 illustrates one embodiment of the invention which may be called a "Run Length Clock Generator." It utilizes known componentry and design techniques to accomplish the functions described. In that regard, pixel and exposure interval data is stored in a memory device 40 in the form that describes one cycle of a square wave, such as the SCAN CLOCK signal waveform 45 illustrated in FIG. 3. In other words, it describes the number of slices that are high and the number of slices that are low.

Figure 3:
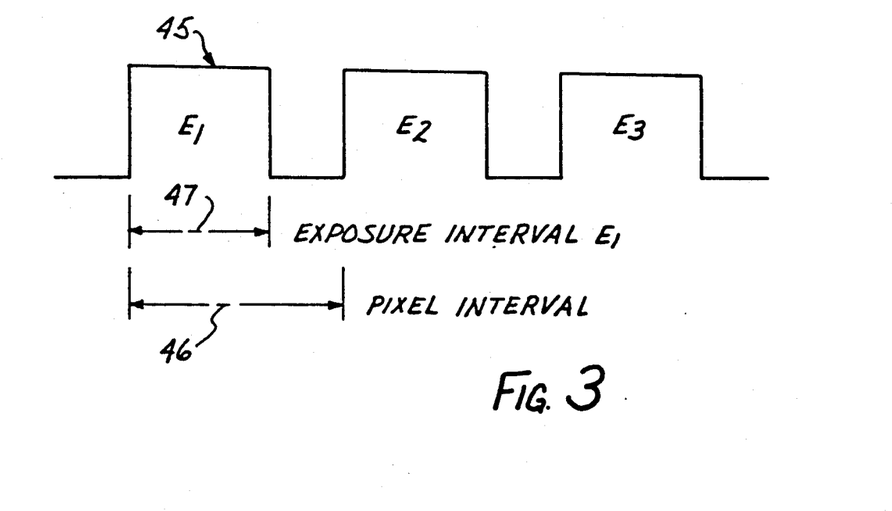
FIG. 3 is a diagrammatic representation of the scan clock waveform.

As an example, the pixel interval at 46 of the waveform 45 may be considered made up of eight time slices, the illustrated exposure interval $E_1$ at 47 being five of those slices (i.e., the five high slices). The clock controller circuitry 41 varies the pixel intervals so that the leading edge of each of the exposure intervals (such as the illustrated exposure intervals $E_1$, $E_2$, and $E_3$) occurs in desired relationship to each of the desired pixel positions along the scan line 15, preferably at the start of each pixel position, thereby compensating for the non-linearity caused by changes in spot velocity. In addition, the exposure interval is varied to control dwell time at each of the pixel positions, thereby compensating for pixel exposure distortion. For the illustrated scanner system 10, the memory device 40 is a ROM containing the pixel interval and maximum exposure interval that matches the dimensional and exposure compensation needed for the system 10.

Clock controller circuitry 41 receives a high frequency signal from a slice oscillator 42 (e.g., about 40-100 MHz), as well as the digital data from the memory device 40. It contains counters and logic to generate the SCAN CLOCK output signal in accordance with the digital data. In other words, the clock cycle corresponding to the pixel interval is high for an interval corresponding to the maximum exposure interval. During an appropriate time in the scan clock cycle, a memory address counter 43 advances and the data for the next pixel is then supplied from the memory device 40 to the clock controller circuitry 41.

Figure 4:
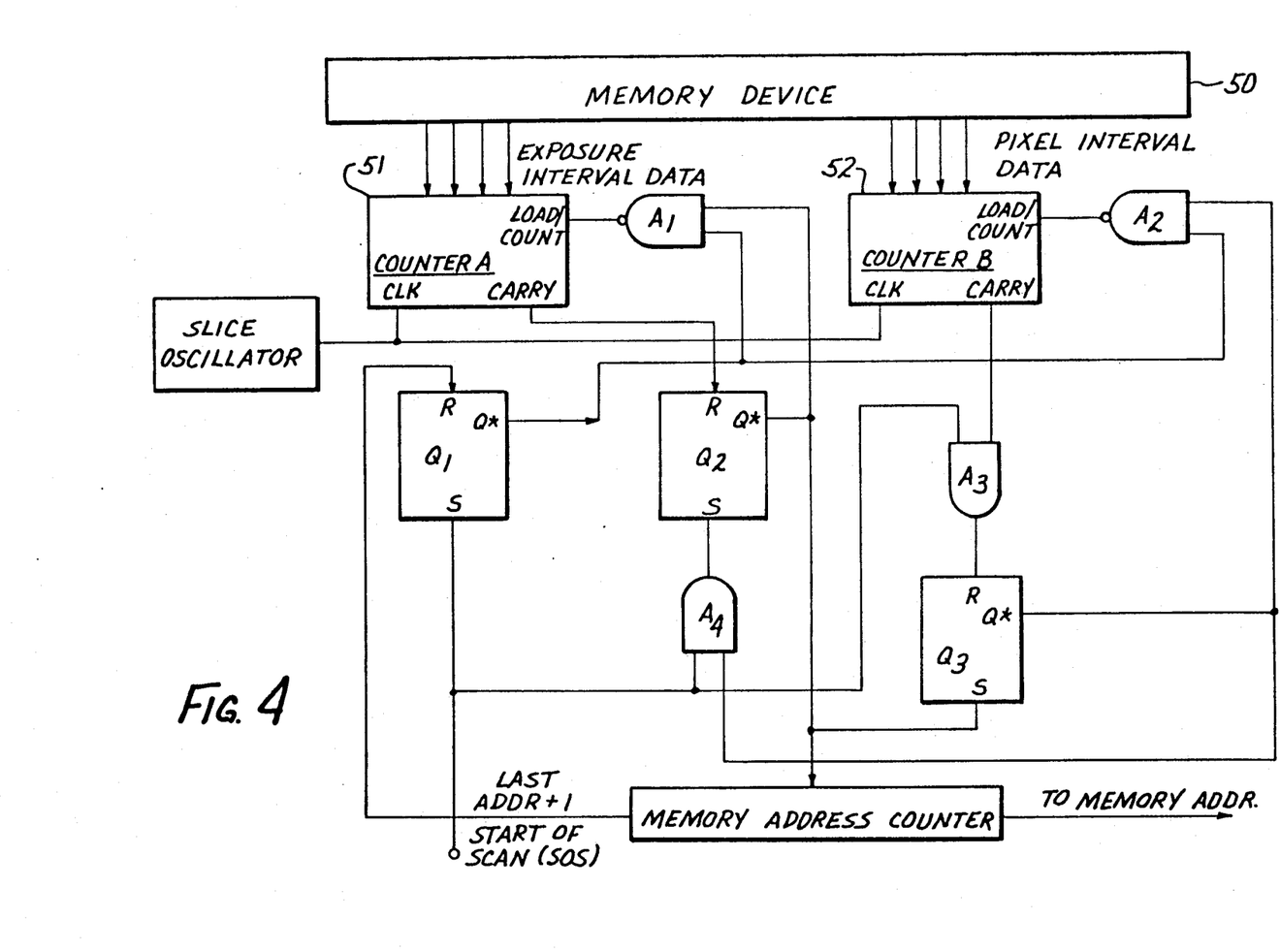
FIG. 4 is a block diagram of clock controller circuitry.

FIG. 4 illustrates one configuration of the clock controller circuitry 41. Initially the run length data (i.e., exposure interval and pixel interval data) is loaded from a memory device 50 (corresponding to the memory device 40 in FIG. 2) into two presetable counters, a counter A at 51 in FIG. 4 and a counter B at 52, as the complement of the number of slices to count. At the receipt of some event signal, such as a start of scan detection signal, the flip-flops $Q_1$ and $Q_2$ are set and $Q_3$ is reset. With $Q_1$ and $Q_2$ set, the counter A is switched from a load to a count mode, at which time counter A counts up to its maximum and generates a carry output.

The carry output resets $Q_2$ and that in turn sets $Q_3$. The counter A is now switched to the load mode, whereas the counter B is switched to the count mode. The counter A, the carry output, and $Q_3$ now function in the manner of counter A, its carry output, and $Q_2$ during the first half of the pixel cycle. When $Q_3$ is reset, the address counter is advanced, loading the data for the next pixel into the counters, and the sequence is restarted with the setting of $Q_2$. That process continues until a memory address counter 53 (corresponding to the counter 43 in FIG. 2) has reached its maximum. At that time, $Q_1$ is reset, and the clock controller circuitry halts until the next event signal.

Figure 5:
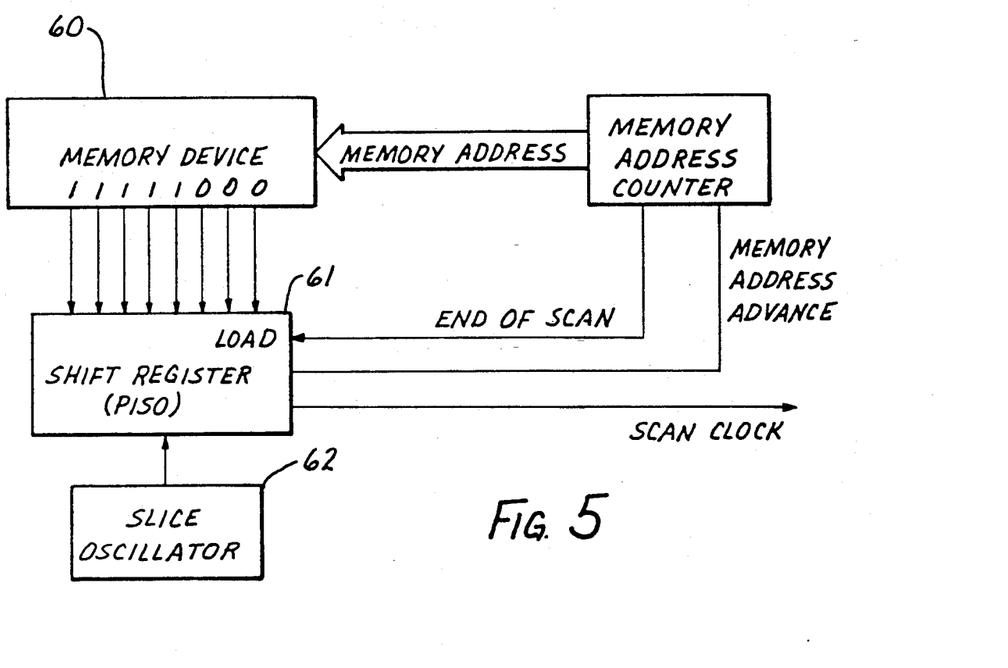
FIG. 5 is a diagrammatic representation in block diagram form of another embodiment of the light source control circuitry referred to as a bit mapping clock generator.

FIG. 5 illustrates another embodiment of the invention that may be called a "Bit Mapping Clock Generator." A memory device 60 contains the pixel and exposure interval data in a form that describes the condition of each slice in each pixel (i.e., high or low). Thus, it may be said to employ bit mapping. As a with the embodiment illustrated in FIG. 2, the memory device 60 is static, although it may be dynamic so that at least one of the pixel interval data and the exposure interval data is varied from one scan line to another scan line using known digital techniques.

Figure 6:
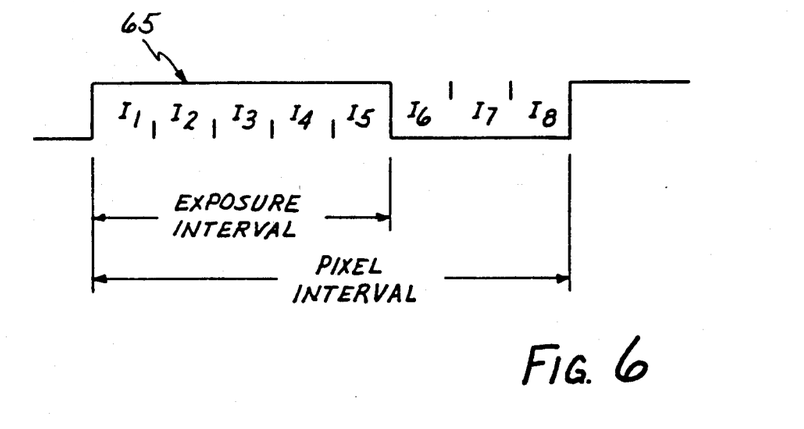
FIG. 6 is a diagrammatic representation of the scan clock waveform for the bit mapping clock generator.

For the embodiment illustrated in FIG. 5, a shift register 61 functions as clock controller circuitry corresponding to the clock controller circuitry 41. It operates parallel-in-serial-out (PISO) while a slice oscillator 62 provides the timing. The SCAN CLOCK signal waveform 65 results (FIG. 6). The illustrated cycle has an exposure interval composed of waveform intervals $I_1$ through $I_5$ (five slices) and a pixel interval composed of waveform intervals $I_1$ through $I_8$ (all eight slices). Thus, the SCAN CLOCK signal is such that the leading edge or point at which the waveform interval $I_1$ goes high is controlled according to spot velocity in order to compensate for pixel position distortion (i.e., position the pixels more evenly along the scan line 15) while the number of waveform intervals or slices making up the exposure interval is controlled in order to compensate for pixel exposure distortion.

In most applications, the degree of distortion to be compensated or inserted is not over twenty percent. To use the memory to the best advantage, the counter A and the counter B shown in FIG. 4 can be divided into one fixed counter and one setable counter, the fixed counter providing the minimum count, such as eighty percent, and the setable counter providing the remainder. In some applications the maximum exposure time is constant, and the counter A can be a fixed read and counter. A similar technique can be implemented in the Bit Mapping Clock Generator, where one portion of the PISO shift register 61 is loaded with fixed values and the remainder is loaded from the memory. In most applications, two or three bits for each pixel, and not more than four, will provide sufficiently fine control to maintain the degree of distortion within a fraction of a percent of the desired result. Of course, any of various other circuits may be employed within the broader inventive concepts disclosed provided they are configured to control the position and exposure of each pixel in order to offset for scanner non-linearity or non-linearity in data being written.

Thus, the invention provides a scanner having a control system that includes means for electronically controlling both pixel position and pixel exposure. It compensates for both pixel exposure distortion and pixel position distortion. It does so by turning the light beam on and off in a way that achieves a more consistent dwell time from pixel to pixel. It avoids varying light beam intensity. It provides significantly improved control of pixel position and exposure, and it can be configured to compensate for distortion inherent in data being written.

Another aspect of the invention concerns processing of image data. There are at least three known image manipulation algorithms for processing image data for an image display system such as a video systems or a printing system. They are commonly referred to as bitmap, band swap, and data compression, and they are usually embodied in some form of electronic hardware and software that can be referred to as an image processing controller (IPC).

The bitmap method has no limit on complexity of the images either graphic or text data, but it needs memory to sustain the data. A display area 11"×8" with 300 dots-per-inch (dpi) resolution, for example, requires one million bytes of memory just for image data. In addition, it needs more time to output the display because it must finish the whole display area before sending data to the display.

The band swap method can reduce the amount of memory needed by using two or more small bands of memory to only process part of the display area, but it is limited by the complexity of the data to be processed. In other words, if the data are too complex to be handled by the IPC, then the IPC cannot put processed data into the bands fast enough to keep up with the on-going display. For the display area example of 11"×8" with 300 dpi, the band swap method only needs 64 to 300 thousand bytes of memory, and it can output the display data faster if the complexity is nominal.

The data compression method can use coding compression (e.g., run length coding) or image transformation (e.g., Fourier transformation) to squeeze data into a smaller amount of memory for storage. Then, it decompresses the data at the time of display. So the IPC has compression and decompression mechanisms, and that can be very complex to implement. The IPC can have just a decompression mechanism, but the input data must then be in a compressed format, a less popular format.

Accordingly, another aspect of this invention provides a hybrid method of processing image data that is a combination of both the bitmap and the band swap methods. A key concept is the management of available memory and the timing control that enables the IPC to use main memory instead of using additional image memory. The hybrid method includes sensing the total amount of installed memory and allocating memory for system use when the image display system is initialized for handling jobs. It includes sensing the total amount of memory available for image data and dividing that memory into bands to be loaded for processed image data. Whenever the amount of memory available for image data is sufficient for the whole image area, the user is informed that the bitmap mode is available and the user has the authority to enforce bitmap mode for high complexity image processing jobs. Whenever the amount of memory available for image data is sufficient for twice the whole image area, the bitmap mode is automatically employed without failing to keep up with a desired throughput.

Thus, with the hybrid method, the amount of installed memory can be proportional to the level of complexity that the image display system can handle and still keep the designed throughput. That is not true for the fixed band swap method. In addition, the hybrid method does not need the large initially required amount of memory that the bitmap method does.

Stated another way, the method of processing image data includes sensing the amount of available memory and utilizing the appropriate one of two different processing methods. A first method of processing image data (e.g., the bit map method) is used when the amount of available memory exceeds a predetermined threshold (i.e., sufficient memory for the bit map method). A second method of processing the image data (e.g., the band swap method) is used when the amount of memory available does not exceed the predetermined threshold. When the band swap method is used, the method proceeds by preparing as many bands as may be appropriate for the memory available. So doing results in less idle time.

Figure 7:
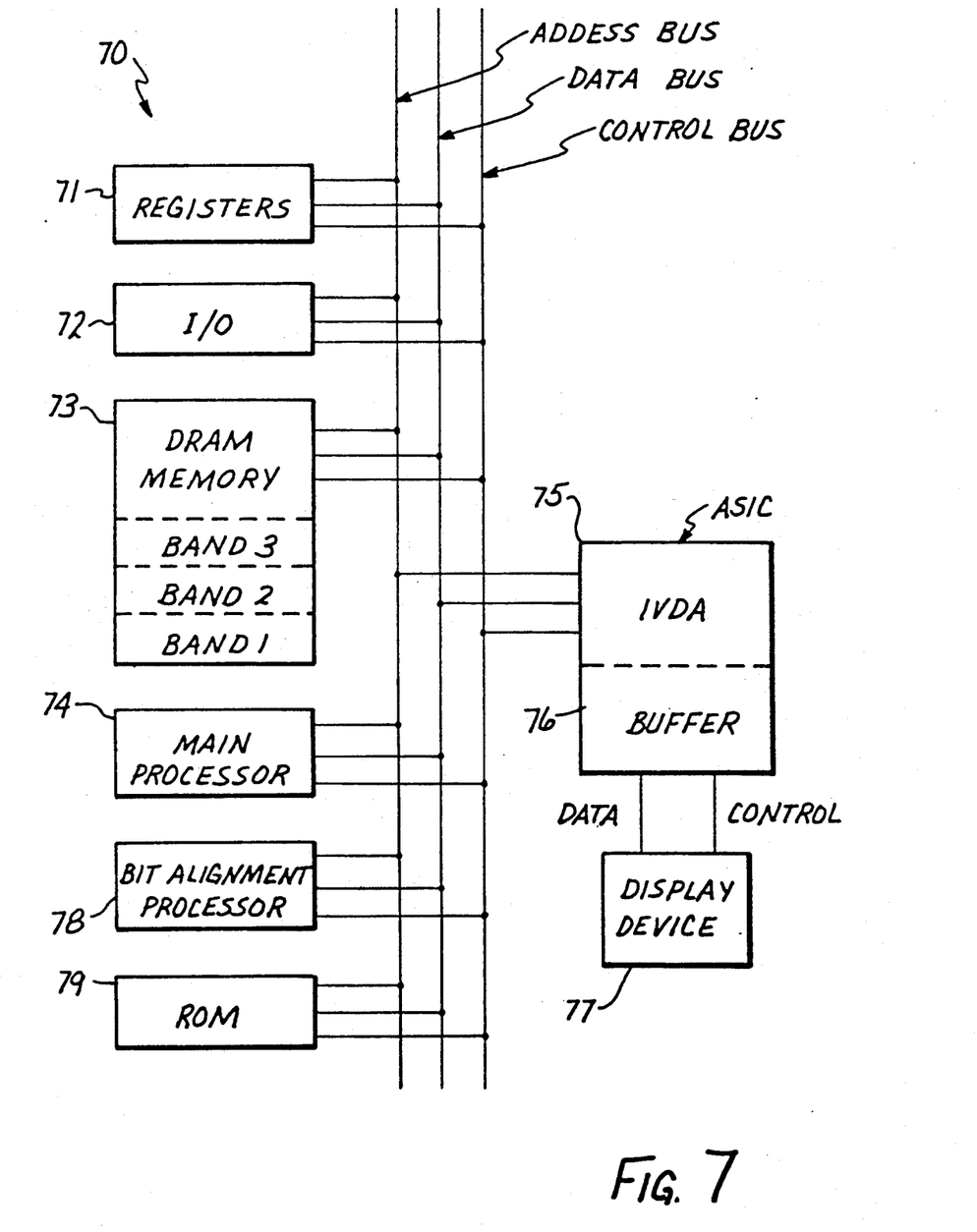
FIG. 7 is a block diagram of a circuit for processing image data to be written with the scanner.

A system 70 for processing image data according to the invention is illustrated in block diagram form in FIG. 7. The registers 71 include front panel and font cartridges and temporary data buffers. The I/O ports 72 can be parallel ports, serial ports (e.g., RS232 or RS422) or an SCSI port controlled by a main processor or dedicated I/O processor. The dynamic random access memory 73 holds raw data and down loads fonts from a computer, such as a personal computer (PC) coupled to the address, data, and control buses. The main processor 74 manages all available resources, and controls the data processing sequence. In addition, it maintains RAM together with the intelligent video display ASIC 75.

ASIC stands for "application specific integrated circuit," and the ASIC 75 is configured accordingly, using known componentry and design techniques to achieve the functions described. It takes data from the bands prepared in the memory 73 according to the known band swap method (modified to the extent of preparing more bands that usual). The bands are accessed and maintained by both the ASIC 75 and the main processor 74, the ASIC 75 transferring the data from the bands to the buffer 76 within the ASIC 75 for final display on the display device 77 (e.g., a personal computer display). It is intended that the display device 77 also represent a printer, such as the scanner system 10.

The bit alignment processor 78 gets data from the registers 71 (loaded by the main processor 74) and processes the data into proper bit line format according to the bit mapping method. Then, it loads the data into registers for the main processor 74 to transfer to bands in RAM, ready for the ASIC 75 to access for display on the display device 77. The read only memory 79 stores all the processing and control firmware, as well as the resident fonts.

Thus, the system 70 incudes an ASIC (i.e., the ASIC 75) that is configured to combine first and second methods of processing image data according to memory availability, preferably the bit map method when an amount of available memory exceeds a predetermined threshold and the band swap method when the amount of memory available does not exceed the predetermined threshold. In addition, an abundance of bands are prepared whenever memory is available to make more efficient use of processing time and memory.

We claim:

1. A scanner system, comprising:
means defining a light source for producing a light beam of constant intensity;
scanning means for directing the light beam to a spot on a surface to be scanned that is located at a predetermined location relative to the scanning means and for moving the spot across the surface along a scan line of a predetermined length; and
means defining an electronic control system for controlling the light beam in order to produce a plurality of pixels on the surface along the scan line, which control means is configured to control the position and exposure of each of the pixels by maintaining a constant exposure interval of the light beam and varying the pixel interval to compensate for varying spot velocity along the scan line.

2. A scanner system as recited in claim 1, wherein the control system is configured to produce a control signal for activating the light beam at each of a plurality of desired pixel positions along the scan line.

3. A scanner system as recited in claim 2, wherein the control signal defines a pixel interval for each pixel position.

4. A scanner system as recited in claim 3, wherein the control system is configured to vary the pixel interval defined by the control signal according to spot velocity.

5. A scanner system as recited in claim 4, wherein the control system is configured to synchronize the control signal with spot position in order to vary the pixel interval according to spot velocity.

6. A scanner system as recited in claim 1, wherein the control system is configured to produce a control signal for activating the light beam for a desired dwell time for each of a plurality of desired pixel positions along the scan line.

7. A scanner system as recited in claim 6, wherein the control signal defines an exposure interval for each pixel position.

8. A scanner system as recited in claim 7, wherein the control system is configured to maintain the exposure interval defined by the control signal constant for each desired level of pixel intensity throughout the scan line.

9. A scanner system as recited in claim 8, wherein the control system is configured to synchronize the control signal with spot position in order to maintain the exposure interval constant for each desired level of pixel intensity throughout the scan line.

10. A scanner system as recited in claim 1, wherein the control system is configured to produce a control signal for activating the light beam at each of a plurality of pixel positions along the scan line and for activating the light beam for a desired dwell time for each of the pixel positions.

11. A scanner system as recited in claim 1, wherein:
the control signal defines a pixel interval and an exposure interval for each pixel position; and
the control system is configured to vary the pixel interval according to spot velocity while maintaining the exposure interval constant throughout the scan line for each level of pixel intensity desired.

12. A scanner system as recited in claim 11, wherein the control system is configured to synchronize the control signal with spot position in order to vary the pixel interval according to spot velocity while maintaining the exposure interval constant throughout the scan line for each level of pixel intensity desired.

13. A scanner system as recited in claim 11, wherein the control signal is a digital signal.

14. A scanner system as recited in claim 11, wherein the control system is configured to employ bit mapping.

15. A scanner system as recited in claim 11, wherein the control system is configured to:
produce the control signal according to stored pixel interval data and exposure interval data for a scan line; and
to vary at least one of the pixel interval data and the exposure interval data from one scan line to another scan line.

16. A scanner system as recited in claim 1, wherein:
the control system is configured to process pixel interval data and exposure interval using a hybrid method; and
the hybrid method combines the bitmap method and the band swap method.

17. A scanner system, comprising:
means defining a light source for producing a light beam of constant intensity;
scanning means for directing the light beam to a spot on a surface to be scanned that is located at a predetermined location relative to the scanning means and for moving the spot across the surface along a scan line of a predetermined length; and
means defining an electronic control system for controlling the light beam in order to produce a plurality of pixels on the surface along the scan line, which control means is configured to control the position and exposure of each of the pixels, by generating each pixel by turning the light source on for a fixed pulse width interval while varying the light source at a pulse repetition rate proportional to the scanning velocity of the spot along the scan line, so that both the pixel spacing and the pixel exposure is constant throughout the scan line.

* * * * *